US008531434B2

(12) United States Patent  
Murai et al.

(10) Patent No.: US 8,531,434 B2
(45) Date of Patent: Sep. 10, 2013

(54) TWO-DIMENSIONAL SENSOR ARRAY, DISPLAY DEVICE, AND ELECTRONICS DEVICE

(75) Inventors: Atsuhito Murai, Osaka (JP); Hajime Imai, Osaka (JP); Hideki Kitagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 300 days.

(21) Appl. No.: 13/130,002

(22) PCT Filed: Jul. 30, 2009

(86) PCT No.: PCT/JP2009/063609
§ 371 (c)(1), (2), (4) Date: May 18, 2011

(87) PCT Pub. No.: WO2010/058631
PCT Pub. Date: May 27, 2010

(65) Prior Publication Data
US 2011/0221708 A1    Sep. 15, 2011

(30) Foreign Application Priority Data

Nov. 21, 2008   (JP) ................................ 2008-298688

(51) Int. Cl.
*G06F 3/042*        (2006.01)
(52) U.S. Cl.
USPC .......................................... 345/175; 345/207
(58) Field of Classification Search
None
See application file for complete search history.

(56) References Cited

U.S. PATENT DOCUMENTS

| 6,091,449 | A | 7/2000 | Matsunaga et al. |
| 6,239,839 | B1 | 5/2001 | Matsunaga et al. |
| 6,300,978 | B1 | 10/2001 | Matsunaga et al. |
| 2001/0013901 | A1 | 8/2001 | Matsunaga et al. |
| 2001/0052941 | A1 | 12/2001 | Matsunaga et al. |
| 2002/0149688 | A9 | 10/2002 | Matsunaga et al. |
| 2005/0012839 | A1 | 1/2005 | Matsunaga et al. |
| 2010/0231562 | A1* | 9/2010 | Brown ........................... 345/207 |
| 2010/0238135 | A1* | 9/2010 | Brown et al. ................. 345/175 |

FOREIGN PATENT DOCUMENTS

| WO | WO 97/07629 A1 | 2/1997 |
| WO | WO 2007/145346 A1 | 12/2007 |
| WO | WO 2007/145347 A1 | 12/2007 |

OTHER PUBLICATIONS

International Search Report, dated Oct. 27, 2009, Issued in PCT/JP2009/063609.

* cited by examiner

*Primary Examiner* — Adam R Giesy
(74) *Attorney, Agent, or Firm* — Birch, Stewart, Kolasch & Birch, LLP

(57) ABSTRACT

A display device according to the present invention includes a liquid crystal display panel in which a plurality of pixels are arranged in matrix, and an optical sensor circuit configured by a photodiode (17), a NetA voltage-boosting capacitor, and an output AMP. A driving wiring (Vrwn) for supplying a driving signal to the NetA voltage-boosting capacitor is electrically connected to a power supply wiring (Vsm) for supplying power to the output AMP. This configuration reduces parasitic capacitance resulting from an increase in the number of wirings. This makes it possible to make a display device having a pixel including an optical sensor incorporated therein, the display device capable of avoiding deterioration in sensor accuracy in the optical sensor circuit and preventing a decrease in the aperture ratio of the pixel.

5 Claims, 9 Drawing Sheets

F I G. 1
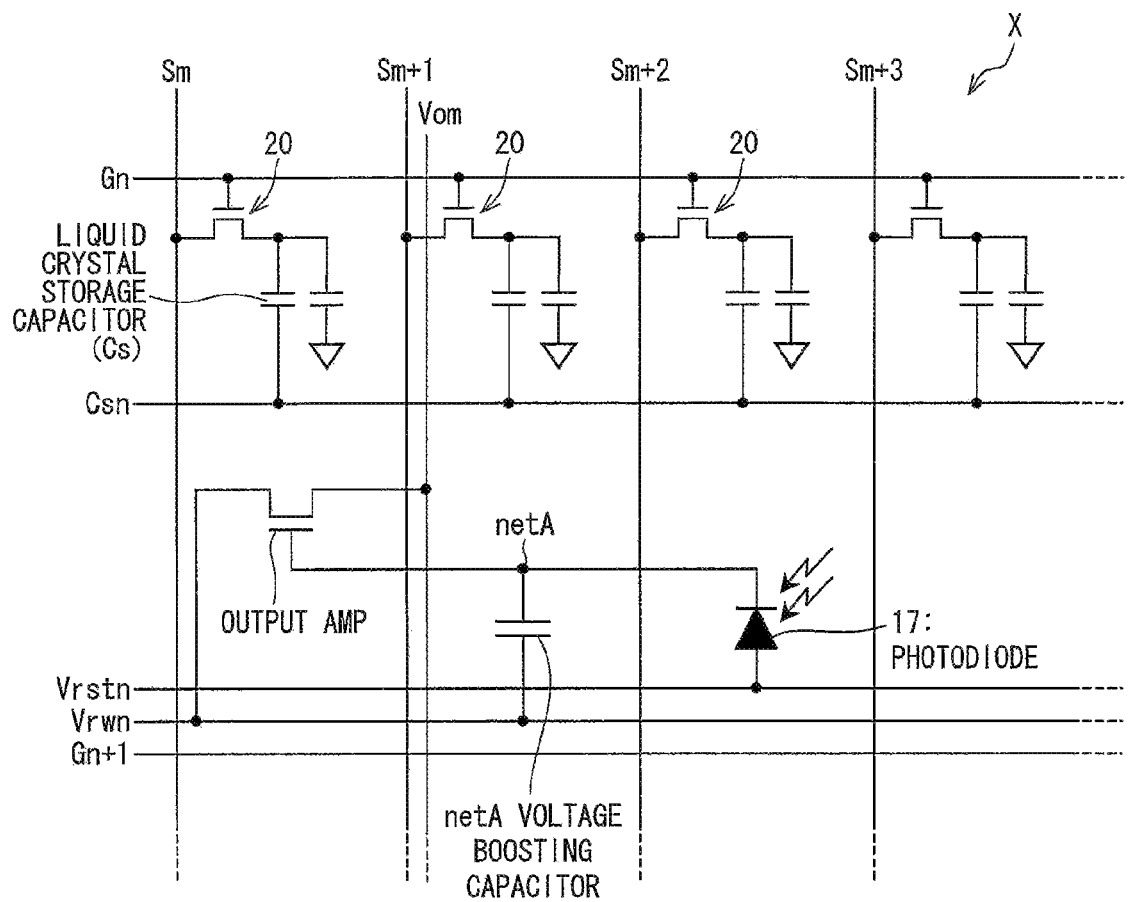

US 8,531,434 B2

TWO-DIMENSIONAL SENSOR ARRAY, DISPLAY DEVICE, AND ELECTRONICS DEVICE

TECHNICAL FIELD

The present invention relates to a display device including a two-dimensional sensor array in which an optical sensor circuit is incorporated.

BACKGROUND ART

Conventionally, there has been developed a display device including a two-dimensional sensor array in which an optical sensor circuit is incorporated.

This display panel faces such a problem that, since the display panel needs an optical sensor circuit and a wiring for driving the optical sensor circuit in a pixel, the pixel has a low aperture ratio compared to a case where the display device includes no two-dimensional sensor array in which an optical sensor circuit is incorporated.

In view of this, Patent Literature 1, for example, discloses a configuration in which an optical sensor output wiring Vom also serves as a display source wiring Sm . . . , and a wiring Vsm for supplying voltage to an output AMP also serves as a display source wiring Sm . . . as illustrated in FIG. 7. This configuration avoids a decrease in the aperture ratio of a pixel, the decrease resulting from providing an optical sensor circuit in the pixel.

CITATION LIST

Patent Literature 1
International Publication No. WO2007/145347 [Publication Date: Dec. 21, 2007]

SUMMARY OF INVENTION

Technical Problem

However, since the display source wiring Sm . . . also serves as the optical sensor output wiring Vom and the display source wiring Sm . . . also serves as the wiring Vsm for supplying voltage to the output AMP in the configuration as illustrated in FIG. 7, it is impossible to read an optical sensor circuit during the charging of a picture element (period in which video data is applied to the source wiring) as shown in FIG. 8. Accordingly, the reading of the optical sensor circuit can be carried out only in a flyback period. This makes it difficult to share the wirings in a case where the flyback period is short, for example, when the resolution of the display is high (VGA, XGA, etc.), or in a case where the output AMP has a low performance (for example, in a case where an AMP transistor is formed from an a-Si).

One possible solution for avoiding such problem is, for example, such that the optical sensor output wiring Vom and the wiring Vsm for supplying voltage to the output AMP are provided in addition to the display source wiring Sm . . . as illustrated in FIG. 9. However, this increases the number of wirings (optical sensor output wiring Vom, wiring Vsm for supplying voltage to the output AMP) for driving the optical sensor circuit. The increase leads to a low aperture ratio of the pixels compared to a case where no optical sensor circuit is provided. That is, in an area (effective display area) contributing to display in the pixel, an increase in the number of wirings for a detecting circuit element results in a decrease in the effective display area (i.e., a decrease in aperture ratio).

In addition, the increase in the number of wirings results in an increase in parasitic capacitance of these wirings. The increase in parasitic capacitance causes a delay in boosting the voltage of the wirings. As a result, it takes more time after the optical sensor circuit receives light until the optical sensor circuit outputs a detecting signal. This deteriorates sensor accuracy in the optical sensor circuit.

The present invention is accomplished in view of the aforementioned problems. An object of the present invention is to make a display device having a pixel including an optical sensor incorporated therein, the display device capable of avoiding deterioration in sensor accuracy in the optical sensor circuit by reducing parasitic capacitance resulting from an increase in the number of wirings, and also capable of avoiding a decrease in the aperture ratio of the pixel and an increase of a frame area around a display section.

Solution to Problem

In order to attain the object, a two-dimensional sensor array according to the present invention is a two-dimensional sensor array including: at least a photodiode outputting a signal with a value according to the quantity of light received by the photodiode; a thin film transistor element; and a charge storage element, the charge storage element having one electrode thereof electrically connected to the cathode electrode of the photodiode and having the other electrode thereof electrically connected to a driving wiring for supplying a driving signal to the charge storage element, the thin film transistor element having the gate electrode thereof electrically connected to the cathode electrode of the photodiode and having the drain electrode thereof electrically connected to an optical sensor output wiring, and the driving wiring for the charge storage element being electrically connected to a power supply wiring electrically connected to the source electrode of the thin film transistor element.

According to the configuration above, in the two-dimensional sensor array, the driving wiring for the charge storage element is electrically connected to the power supply wiring. This makes it possible to reduce parasitic capacitance formed between the power supply wiring and the driving wiring for the charge storage element, which driving wiring intersects the power supply wiring in conventional cases.

Thus, the reduction in parasitic capacitance will reduce a delay in boosting the voltage of the driving wiring for the charge storage element, thereby making it possible to improve sensor accuracy in the optical sensor circuit.

Further, due to being electrically connected to each other, the driving wiring for the charge storage element and the power supply wiring can supply a signal through the same driving circuit. Thus, one less driving system in the optical sensor circuit makes it possible to increase yields of the two-dimensional sensor array, reduce costs, and narrow a frame width.

In order to attain the object, a display device according to the present invention is a display device including: a pixel array in which a plurality of pixels are arranged in matrix, each of the plurality of pixels including a display element and a switching element connected to the display element; and a two-dimensional sensor array in which a plurality of optical sensor circuits are two-dimensionally arranged, each of the optical sensor circuits including at least a photodiode outputting a signal with a value according to the quantity of light received by the photodiode, a thin film transistor element, and a charge storage element, the charge storage element having one electrode thereof electrically connected to the cathode electrode of the photodiode and having the other electrode thereof electrically connected to a driving wiring for supplying a driving signal to the charge storage element, the thin film transistor element having the gate electrode thereof electrically connected to the cathode electrode of the photodiode and having the drain electrode thereof electrically connected to an optical sensor output wiring, the driving wiring for the charge storage element is electrically connected to a power supply wiring electrically connected to the source electrode of the thin film transistor element.

According to the configuration above, in the display device, the driving wiring for the charge storage element is electrically connected to the power supply wiring. This makes it possible to reduce parasitic capacitance formed between the power supply wiring and the driving wiring for the charge storage element, which driving wiring intersects the power supply wiring in conventional cases.

Thus, the reduction in parasitic capacitance will reduce a delay in boosting the voltage of the driving wiring for the charge storage element, thereby making it possible to improve sensor accuracy in the optical sensor circuit.

Further, due to being electrically connected to each other, the driving wiring and the power supply wiring can supply a signal through the same driving circuit. Thus, one less driving system in the optical sensor circuit makes it possible to increase yields and reduce costs of the two-dimensional sensor array. As a result, it becomes possible to reduce costs of the display device.

Further, as described above, one less driving system in the optical sensor circuit makes it possible to decrease the ratio of the wirings of the optical sensor circuit in the area (effective display area) contributing to display in the pixel. As a result, it becomes possible to avoid a decrease (aperture ratio decrease) in the effective display area.

The display element may be a liquid crystal display element.

The two-dimensional sensor array and the display device can be employed in any electronics device for utilizing a detection result of a photodiode (photoelectric element).

Advantageous Effects of Invention

As described above, the liquid crystal display device according to the present invention includes: at least a photodiode outputting a signal with a value according to the quantity of light received by the photodiode; a thin film transistor element; and a charge storage element, the charge storage element having one electrode thereof electrically connected to the cathode electrode of the photodiode and having the other electrode thereof electrically connected to a driving wiring for supplying a driving signal to the charge storage element, the thin film transistor element having the gate electrode thereof electrically connected to the cathode electrode of the photodiode and having the drain electrode thereof electrically connected to an optical sensor output wiring, and the driving wiring for the charge storage element being electrically connected to a power supply wiring electrically connected to the source electrode of the thin film transistor element. This configuration makes it possible to reduce parasitic capacitance formed between the power supply wiring and the driving wiring for the charge storage element, which driving wiring intersects the power supply wiring in conventional cases. The reduction in parasitic capacitance makes it possible to improve sensor accuracy of a detecting circuit element in the optical sensor circuit.

BRIEF DESCRIPTION OF DRAWINGS

FIG. 1 is an equivalent circuit diagram of an equivalent circuit for one pixel in an optical sensor TP system according to one embodiment of the present invention.

DESCRIPTION OF EMBODIMENTS

One embodiment of the present invention will be described below. This embodiment is explained, referring to an example in which a display device according to the present invention is employed in a liquid crystal display device incorporating an optical sensor touch panel therein (hereinafter referred to as an optical sensor TP system).

Figure 2:
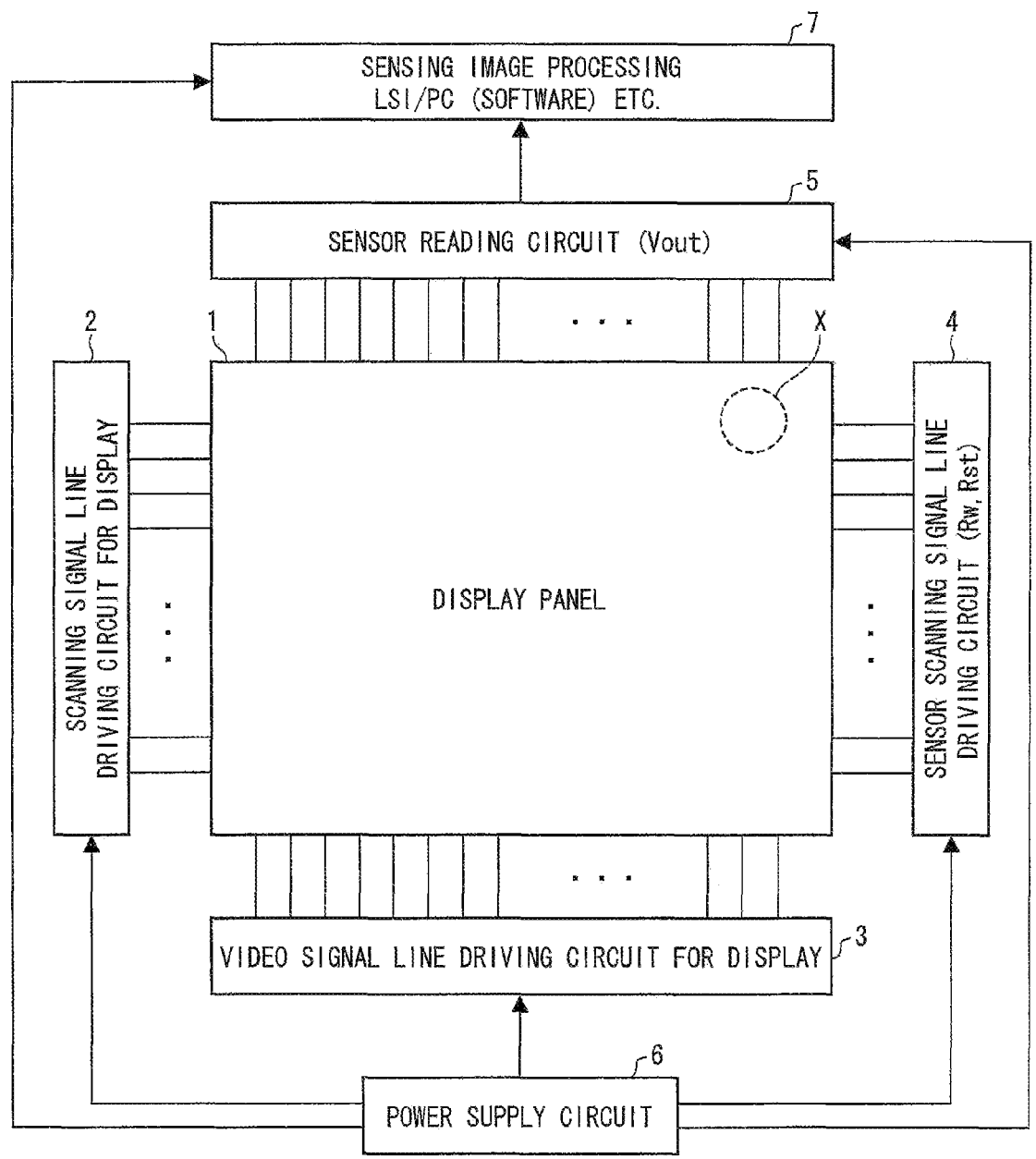
FIG. 2 is a block diagram of a configuration of main sections of the optical sensor TP system.

As illustrated in FIG. 2, the optical sensor TP system according to the present embodiment includes a display panel 1 including a photodiode (photoelectric element) serving as an optical sensor, and also includes, in a manner surrounding the display panel 1, a scanning signal line driving circuit 2 for display and a video signal line driving circuit 3 for display, which are circuits for causing the display panel 1 to display, a sensor scanning signal line driving circuit 4 and a sensor reading circuit 5, which are circuits for causing the display panel 1 to function as a touch panel, a sensing image processing LSI 7 (PC (including software)) for determining touched coordinates based on sensing data from the sensor reading circuit 5, and a power supply circuit 6.

Here, it should be noted that the liquid crystal display device as illustrated in FIG. 2 is merely an illustrative example and the present invention is not limited to this configuration. As one alternative, the present invention may employ a configuration in which the sensor scanning signal line driving circuit 4 and the sensor reading circuit 5 are included, as functions, in other circuits, specifically, in the scanning signal line driving circuit 2 for display, the video signal line driving circuit 3 for display, or the like, or a configuration in which the sensor reading circuit 5 is included in the function of the sensing image processing LSI 7.

FIG. 1 is a one-pixel equivalent circuit of an enlarged part of the display panel 1 as illustrated in FIG. 2

Figure 3:
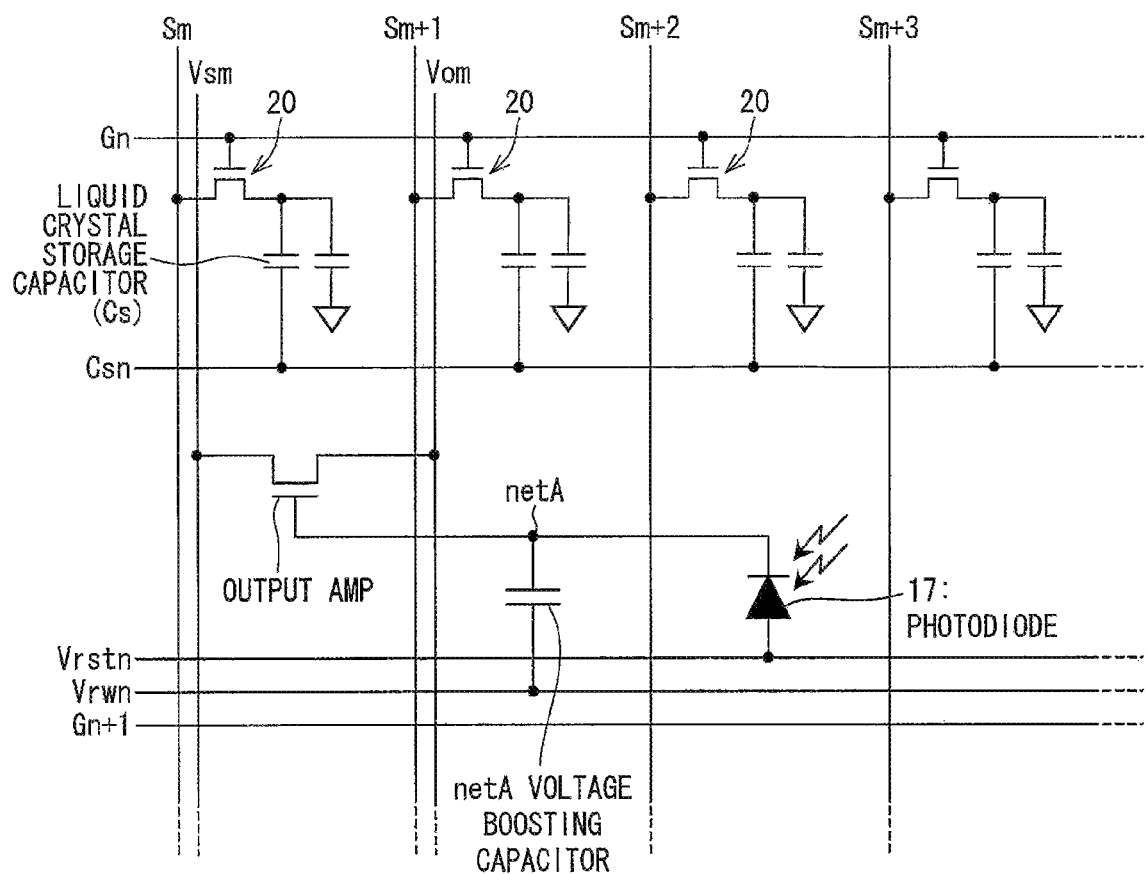
FIG. 3 is an equivalent circuit diagram of an equivalent circuit of a comparative example for the equivalent circuit schematic as illustrated in FIG. 1

FIG. 3 is a comparative example for the equivalent circuit as illustrated in FIG. 1.

Here, the display panel 1 is exemplified as an active matrix type liquid crystal display panel, in which pixels are arranged in matrix and each of the pixels is driven independently. In FIGS. 1 and 3, 'n,' 'n+1,' 'm,' and 'm+1' written at the ends of the names of the wirings indicate 'n-th row,' '(n+1)-th row,' 'm-th row,' and '(m+1)-th row,' respectively.

First, the comparative example will be described below. As illustrated in FIG. 3, one pixel X in the display panel 1 includes: a pixel array in which a plurality of pixels are arranged in matrix, each of the plurality of pixels being formed from three sub pixels each including a display driving TFT element (switching element) 20 connected to a liquid crystal capacitor (display element); and a two-dimensional sensor array in which a plurality of optical sensor circuits are two-dimensionally arranged in a manner corresponding to each pixel in the pixel array, each of the plurality of optical sensor circuits being constituted by a photodiode (photoelectric element) 17, a NetA voltage-boosting capacitor (charge storage element), and an output AMP (thin-film transistor element).

Further, as illustrated in FIG. 3, a gate wiring (Gn), a source wiring (Sm), and a storage capacitor wiring (Csn) are provided to serve as wirings for display in the pixel array, and a resetting wiring (Vrstn) for resetting a photodiode (photoelectric element) 17, a wiring (Vrwn) for driving a NetA voltage-boosting capacitor (charge storage element), a wiring (Vsm) for supplying voltage to an output AMP (thin-film transistor element), and an optical sensor output wiring (Vom) are provided to serve as wirings for an optical sensor circuit in the two-dimensional sensor array.

The gate wiring (Gn) is a wiring for supplying, to the display driving TFT element 20, a scanning signal outputted from the scanning signal line driving circuit 2 for display. The source wiring (Sm) is a wiring for supplying, to the display driving TFT element 20, a video signal outputted from the video signal line driving circuit 3 for display, the source wiring (Sm) being arranged in a manner orthogonally intersecting the gate wiring (Gn).

The storage capacitor wiring (Csn) is arranged parallel to the gate wiring (Gn) and connected to a storage capacitor (Cs) formed for the display driving TFT element 20.

The resetting wiring (Vrstn) for resetting the photodiode 17 is arranged parallel to the gate wiring (Gn) and connected to the anode side of the photodiode 17. The resetting wiring (Vrstn) supplies a reset signal outputted from the sensor scanning signal line driving circuit 4.

The driving wiring (Vrwn) for the NetA voltage-boosting capacitor is arranged parallel to the gate wiring (Gn) and connected to an electrode of a NetA voltage-boosting capacitor formed parallel to the photodiode 17, the electrode being on the opposite side to a node NetA on the cathode side of the photodiode 17.

The wiring (Vsm) for supplying voltage to the output AMP is arranged parallel to the source wiring (Sm) and connected to the source electrode of the output AMP.

The optical sensor output wiring (Vom) is a wiring for inputting, to the sensor reading circuit 5, an output signal outputted from the output AMP. The output signal changes according to the quantity of light received by the photodiode 17.

The optical sensor output wiring (Vom) is arranged parallel to the source wiring (Sm) and connected to the drain electrode of the output AMP.

Figure 4:
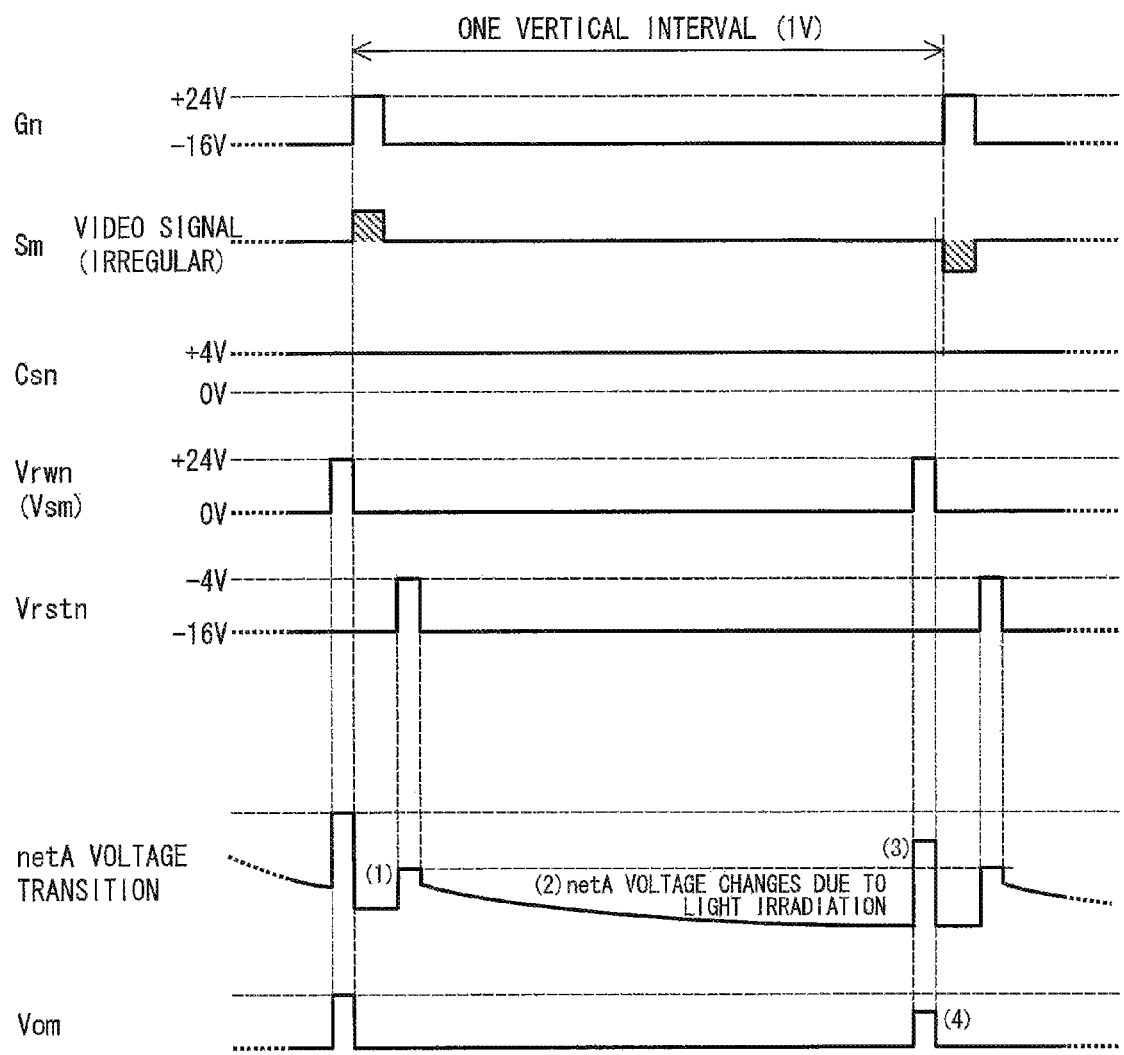
FIG. 4 is a timing diagram corresponding to the equivalent circuit as illustrated in FIG. 1.

Here, the circuits as illustrated in FIGS. 1 and 3 have an element configuration and driving conditions as described below. Timing diagrams of the circuits as illustrated in FIGS. 1 and 3 when the circuits are driven under such conditions are respectively shown in FIGS. 4 and 5. FIG. 4 is a timing diagram of the circuit according to the present invention as illustrated in FIG. 1, and FIG. 5 is a timing diagram of the circuit of the comparative example as illustrated in FIG. 3.

Figure 5:
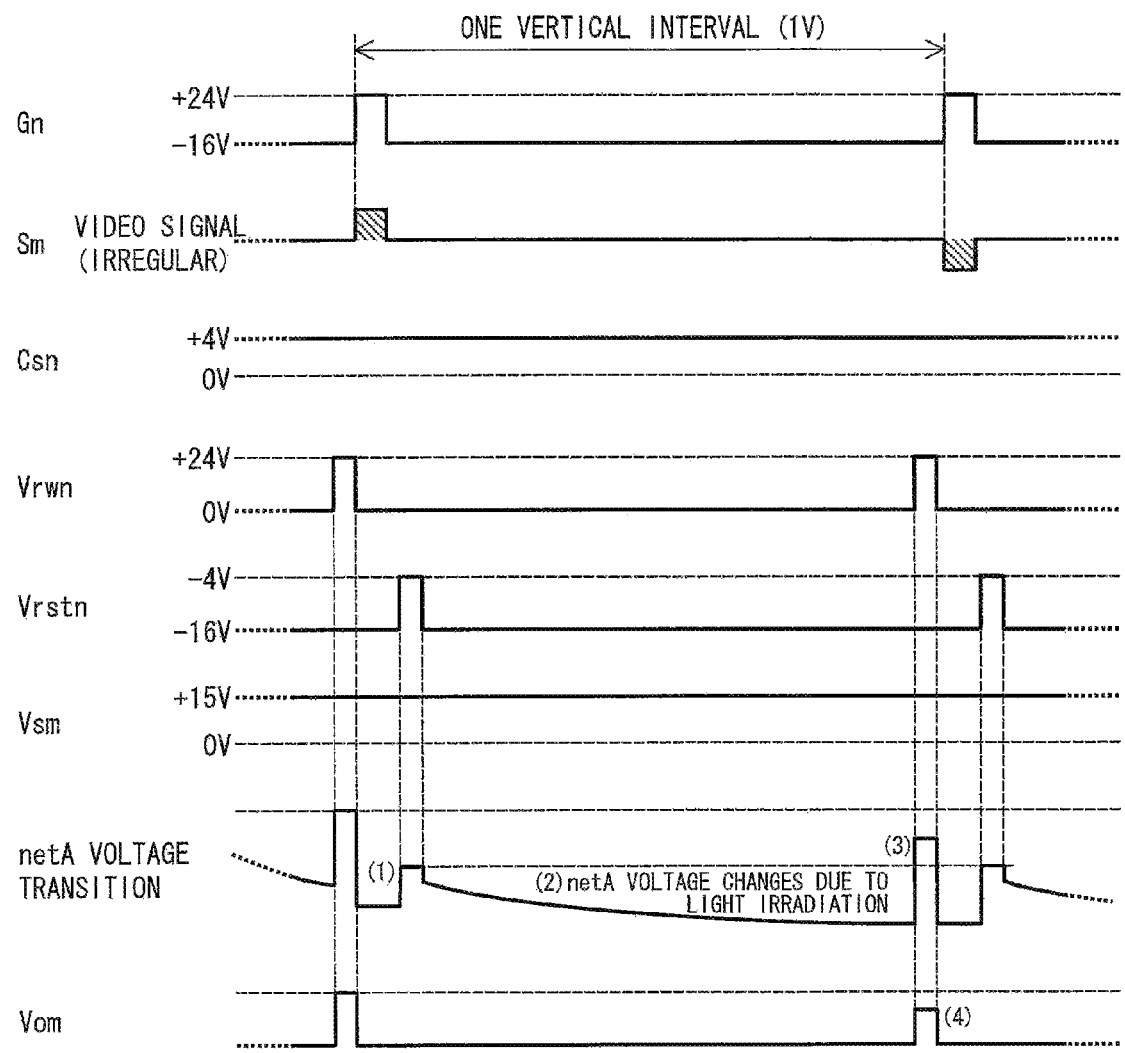
FIG. 5 is a timing diagram corresponding to the equivalent circuit of the comparative example as illustrated in FIG. 3.

<Element Size>
L/W of the photodiode 17: 4/50 μm
capacitance of the capacitor for NetA-boosting: 0.25 pf
L/W of the output AMP: 4/60 μm <Driving Conditions>
driving voltage: see the timing charts in FIGS. 4 and 5
Vrstn: High width 20 μsec
Vrwn: High width 20 μsec
sensor output time (Vom output time): 20 μsec, based on the above.

<Others>
temperature: 27° C.

The timing diagrams of the respective circuits (circuits as illustrated in FIGS. 1 and 3) when the circuits are driven under the conditions as described above are shown in FIGS. 4 and 5, respectively. Here, (1) to (4) as indicated in FIGS. 4 and 5 correspond to (1) to (4) in the following descriptions, respectively.

(1) When the voltage of the Vrstn wiring is boosted (forward electric bias is applied to the photodiode 17), the voltage of NetA is reset to a voltage almost on a reset voltage high level.

(2) The voltage of NetA changes (decreases) according to the quantity of light received by the photodiode 17.

(3) When the voltage of the Vrw wiring is boosted, the voltage of NetA increases. In addition to the increase in the voltage of NetA, the voltage of the source electrode of the output AMP is boosted (the boosted voltage of the Vrw wiring is applied to the source electrode, the boosted voltage having been boosted to a High level), the gate of the output AMP opens, and a voltage according to the Vs voltage (High voltage of the Vrw wiring is outputted therethrough. At this time, the voltage (sensor output Vout) to be outputted changes according to the NetA voltage difference as described above in (2), in other words, according to the extent to which the gate of the output AMP opens.

(4) A state of bright or dark is detected by detecting, outside the panel, the difference (sensor output Vout) as described above in (3).

As described above with reference to the timing diagrams as illustrated in FIGS. 4 and 5, there is no significant difference between the circuit configuration according to the present embodiment and the circuit configuration of the comparative example in terms of driving conditions and timings.

However, in the configuration in which the wirings for a detecting circuit are provided in addition to the wirings for display in the display panel 1 as illustrated in FIG. 3, the increase in the number of wirings leads to a decrease in the aperture ratio of the pixel.

In view of this problem, the present invention employs a configuration as shown in FIG. 1, in which the driving wiring (Vrwn) for the NetA voltage-boosting capacitor, which is one of the wirings for the optical sensor circuit, also serves as the wiring (Vsm) for supplying power to the output AMP. This configuration, in which the necessity for a wiring dedicated for the wiring (Vsm) for supplying power to the output AMP is eliminated, makes it possible to increase the aperture ratio compared to the circuit configuration as illustrated in FIG. 3.

This will be more specifically described below with reference to FIGS. 6(a) and 6(b).

Figure 6:
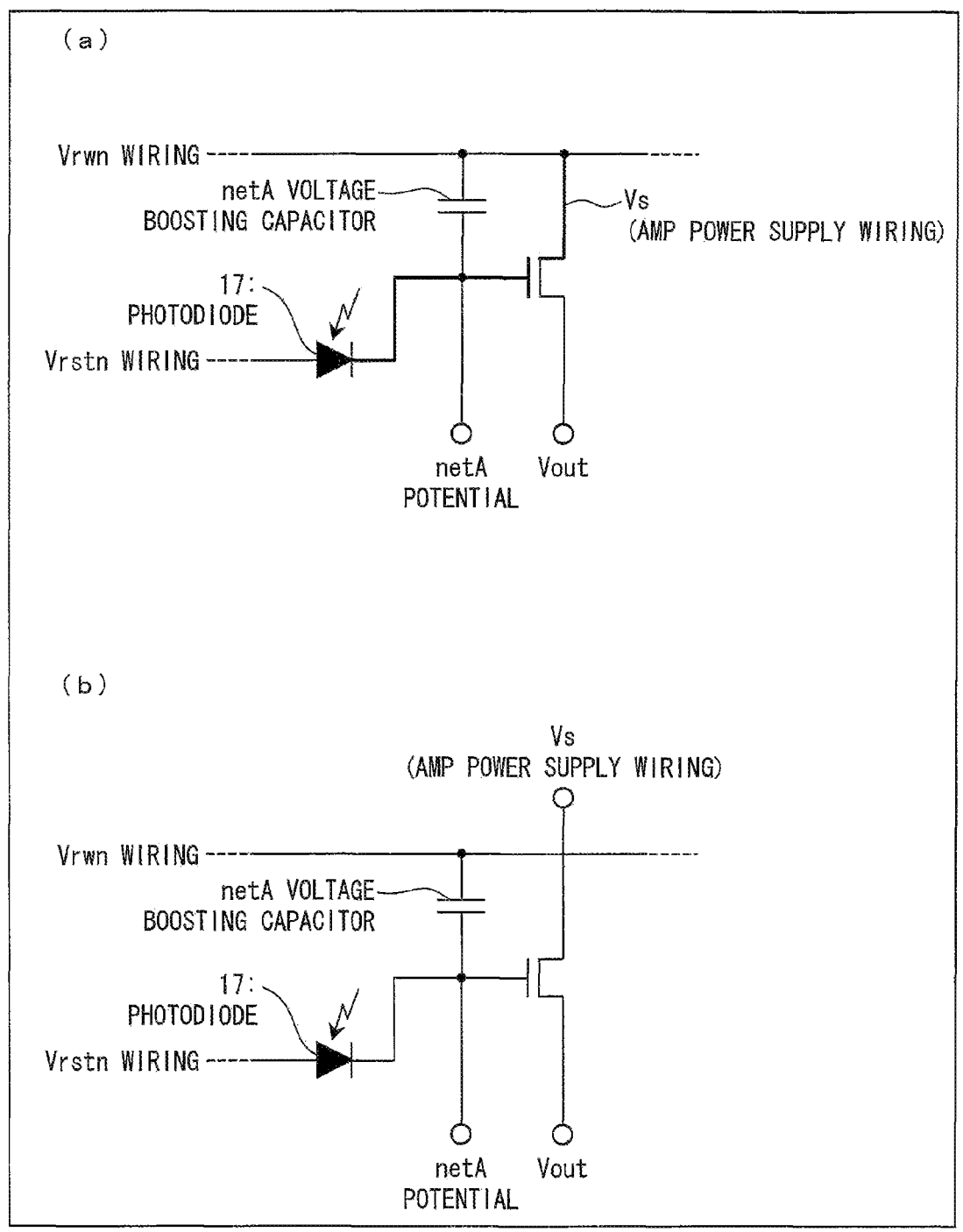
FIG. 6 is a view for describing a configurational difference between optical sensor circuits, wherein (a) is an equivalent circuit diagram of a configuration of an optical sensor circuit according to the present invention and (b) is an equivalent circuit diagram of a configuration of an optical sensor circuit of a comparative example.
Figure 7:
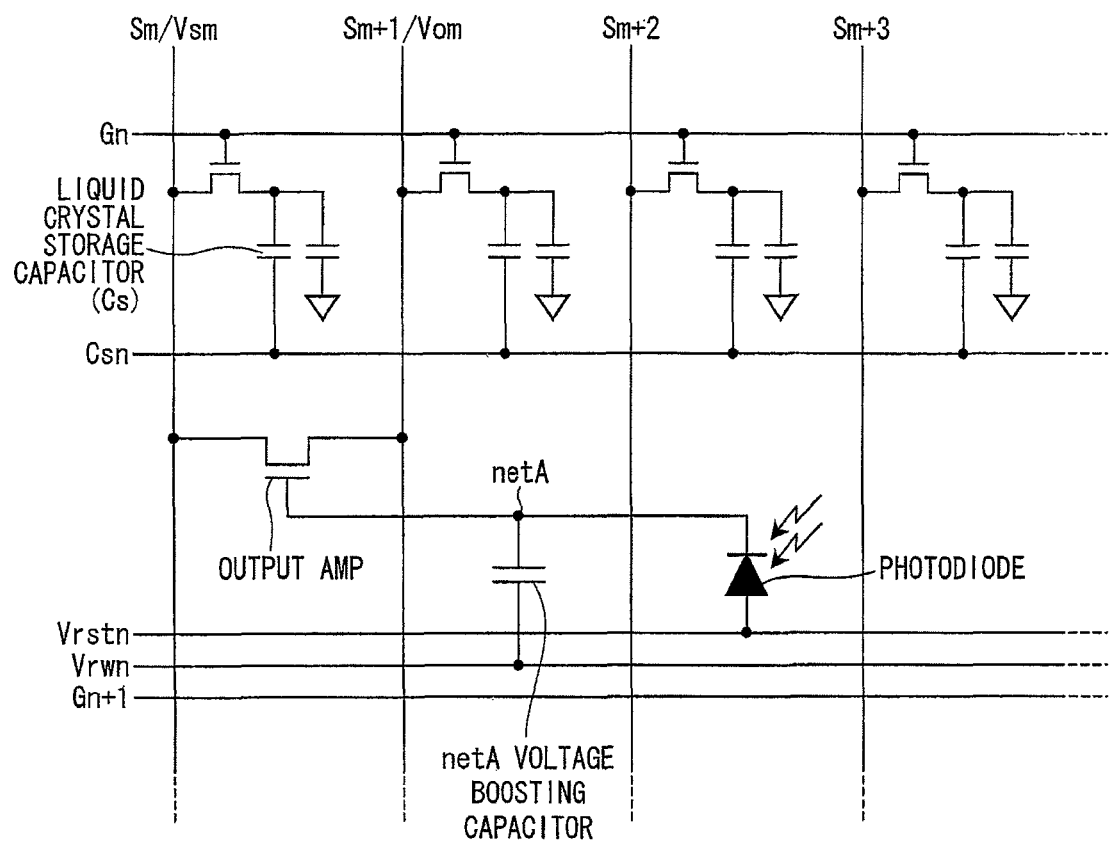
FIG. 7 is an equivalent circuit diagram of a conventional two-dimensional sensor array.
Figure 8:
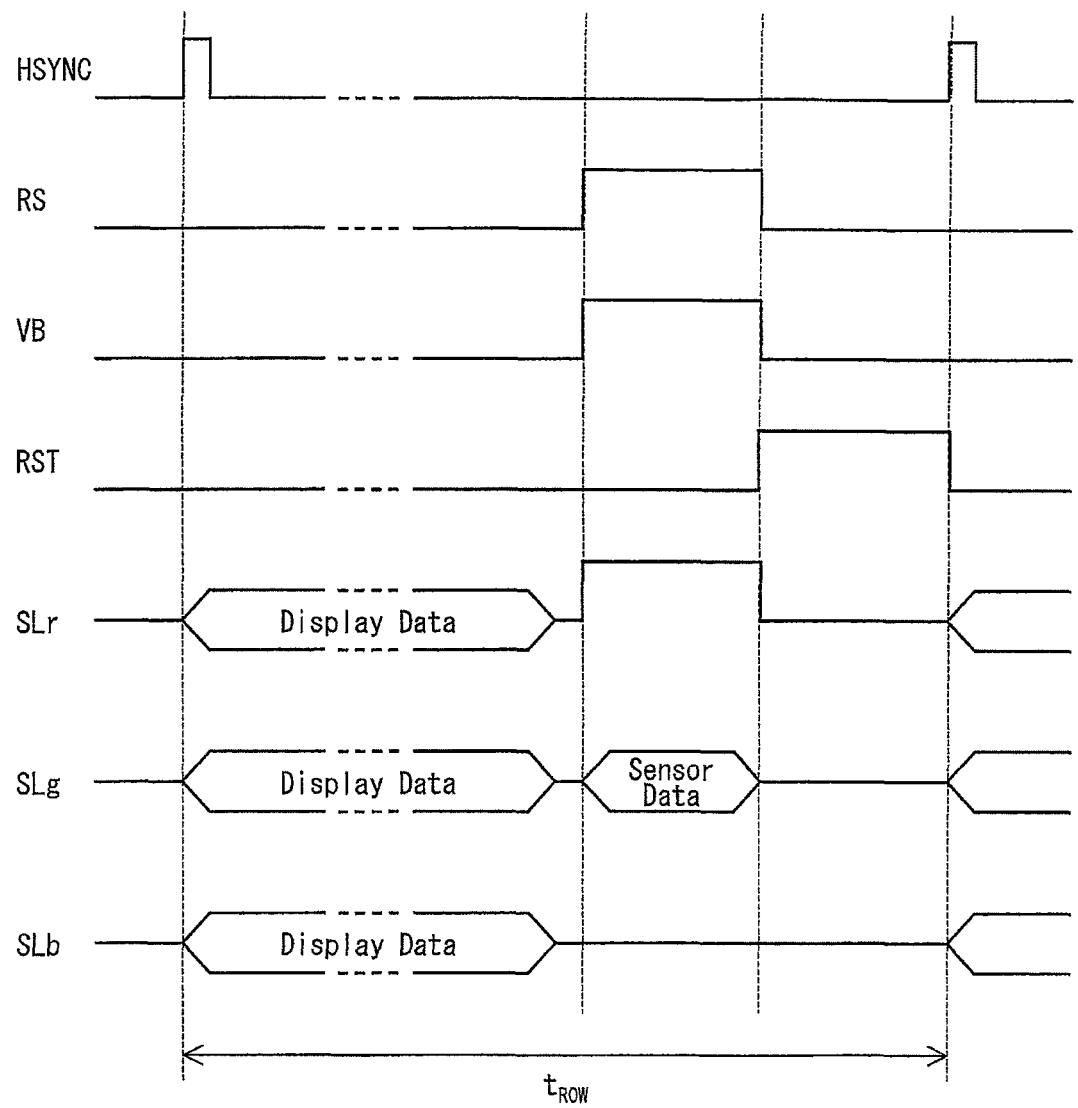
FIG. 8 is a timing diagram of the two-dimensional sensor array as illustrated in FIG. 7.
Figure 9:
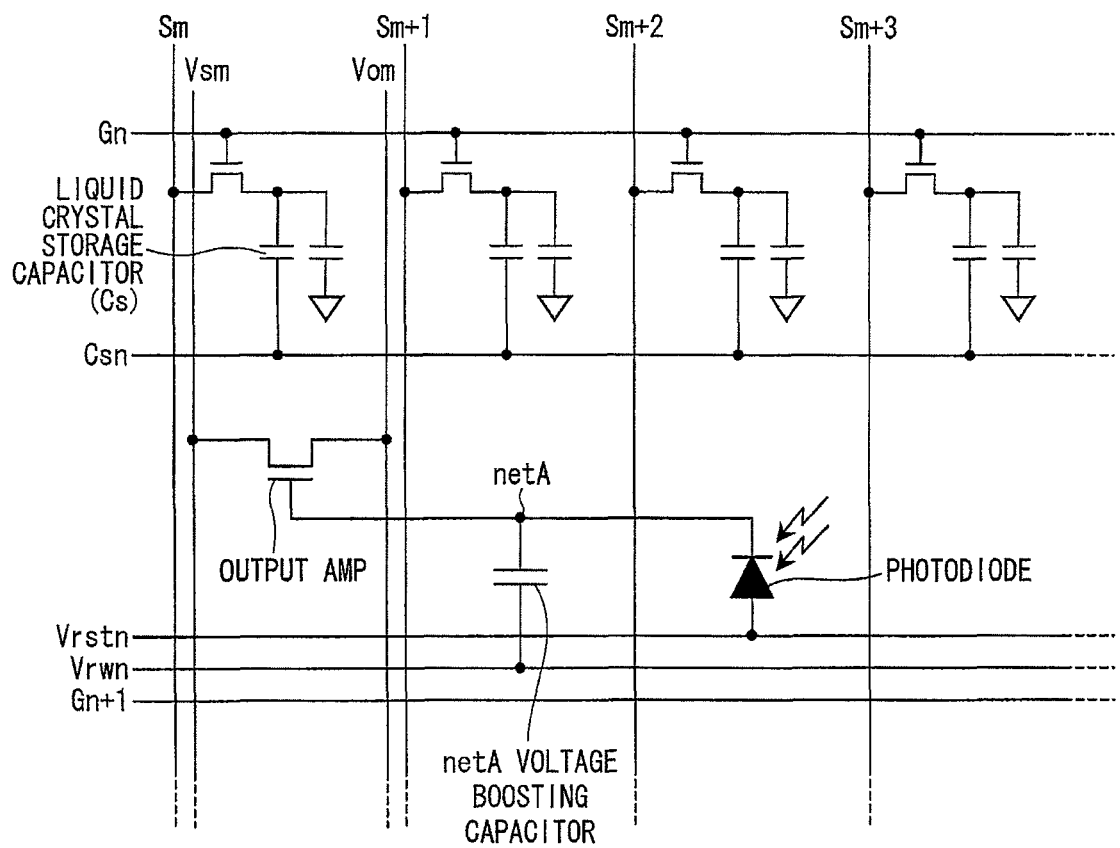
FIG. 9 is an equivalent circuit diagram of another conventional two-dimensional sensor array.

In a circuit configuration of a comparative example as illustrated in FIG. 6(b), the driving wiring (Vrwn) for the NetA voltage-boosting capacitor and the wiring (Vsm) for supplying voltage to the output AMP are provided independently of each other.

On the other hand, in a circuit configuration according to the present embodiment as illustrated in FIG. 6(a), the driving wiring (Vrwn) for the NetA voltage-boosting capacitor and the wiring (Vsm) for supplying voltage to the output AMP are electrically connected to each other (shared).

As described above, in the circuit configuration according to the present embodiment, the reduction in the number of the Vs wirings makes it possible to increase the aperture ratio of the pixel. For example, a 12.1-inch SVGA panel employing the circuit configuration as illustrated in FIG. 6(a) will have a 1.5% higher aperture ratio than that of a 12.1-inch SVGA panel employing the circuit configuration as illustrated in FIG. 6(b).

Thus, as described above, the optical sensor TP system according to the present invention includes: the pixel array in which the plurality of pixels are arranged in matrix, each of the plurality of pixels including the liquid crystal display element (display element) and the switching element connected to the liquid crystal display element; and the two-dimensional sensor array in which the optical sensor circuits are two-dimensionally arranged. The optical sensor circuits are each constituted by the photodiode 17 outputting a signal with a value according to the quantity of light received by the photodiode 17, the output AMP (thin film transistor element), and the NetA voltage-boosting capacitor (charge storage element). The NetA voltage-boosting capacitor has one electrode thereof electrically connected to the cathode electrode of the photodiode 17 and the other electrode thereof electrically connected to the driving wiring (Vrwn) for supplying a driving signal to the NetA voltage-boosting capacitor. The output AMP has the gate electrode thereof electrically connected to the cathode electrode of the photodiode 17 and the drain electrode thereof electrically connected to the optical sensor output wiring (Vom). The power supply wiring (Vsm) electrically connected to the source electrode of the output AMP is electrically connected to the driving wiring (Vrwn) for the NetA voltage-boosting capacitor. This configuration makes it possible to reduce parasitic capacitance formed between the power supply wiring (Vsm) and the driving wiring (Vrwn) for the charge storage element, which driving wiring (Vrwn) intersects the power supply wiring (Vsm) in conventional cases.

The reduction in parasitic capacitance will reduce a delay in boosting the voltage of the driving wiring (Vrwn) for the charge storage element, thereby making it possible to improve sensor accuracy in the optical sensor circuit.

Further, due to being electrically connected to each other, the driving wiring (Vrwn) and the power supply wiring (Vsm) can supply a signal through the same driving circuit. Thus, one less driving system in the optical sensor circuit makes it possible to increase yields and reduce costs of the two-dimensional sensor array. As a result, it becomes possible to reduce costs of the display device.

Further, as described above, one less driving system in the optical sensor circuit makes it possible to decrease the ratio of the wirings of the optical sensor circuit in the area (effective display area) contributing to display in the pixel. As a result, it becomes possible to avoid a decrease (aperture ratio decrease) in the effective display area.

Further, the two-dimensional array sensor according to the present invention can be employed in such electronics devices as a fingerprint sensor and a scanner. The display device according to the present invention can be employed in such electronics devices as a PDA (Personal Digital Assistant) and a cellular phone.

The present invention is not limited to the above-described embodiments but allows various modifications within the scope of the claims. In other words, any embodiment obtained by combining technical means appropriately modified within the scope of the claims will also be included in the technical scope of the present invention.

INDUSTRIAL APPLICABILITY

This invention is readily applicable to an electronics device having a touch panel mounted therein.

REFERENCE SIGNS LIST

1: DISPLAY PANEL
2: SCANNING SIGNAL LINE DRIVING CIRCUIT FOR DISPLAY
3: VIDEO SIGNAL LINE DRIVING CIRCUIT FOR DISPLAY
4: SENSOR SCANNING SIGNAL LINE DRIVING CIRCUIT
5: SENSOR READING CIRCUIT
6: POWER SUPPLY CIRCUIT
17: PHOTODIODE (PHOTOELECTRIC ELEMENT)
20: DISPLAY DRIVING TFT ELEMENT (SWITCHING ELEMENT)

The invention claimed is:

1. A two-dimensional sensor array comprising a plurality of optical sensor circuits which are two-dimensionally arranged and each of which includes: at least a photodiode outputting a signal with a value according to a quantity of light received by the photodiode; a thin film transistor element; and a charge storage element, the charge storage element having one electrode thereof electrically connected to a cathode electrode of the photodiode and having the other electrode thereof electrically connected to a driving wiring for supplying a driving signal to the charge storage element, the thin film transistor element having a gate electrode thereof electrically connected to a cathode electrode of the photodiode and having a drain electrode thereof electrically connected to an optical sensor output wiring, and the driving wiring for the charge storage element being electrically connected to a power supply wiring electrically connected to a source electrode of the thin film transistor element.

2. A display device comprising:

a pixel array in which a plurality of pixels are arranged in matrix, each of the plurality of pixels including a display element and a switching element connected to the display element; and a two-dimensional sensor array in which a plurality of optical sensor circuits are two-dimensionally arranged, each of the optical sensor circuits including at least a photodiode outputting a signal with a value according to a quantity of light received by the photodiode, a thin film transistor element, and a charge storage element, the charge storage element having one electrode thereof electrically connected to a cathode electrode of the photodiode and having the other electrode thereof electrically connected to a driving wiring for supplying a driving signal to the charge storage element, the thin film transistor element having a gate electrode thereof electrically connected to a cathode electrode of the photodiode and having a drain electrode thereof electrically connected to an optical sensor output wiring, and the driving wiring for the charge storage element being electrically connected to a power supply wiring electrically connected to a source electrode of the thin film transistor element.

3. The display device of claim 2, wherein the display element is a liquid crystal display element.

4. An electronics device comprising;
a two-dimensional sensor array including;
a plurality of optical sensor circuits which are two-dimensionally arranged and each of which includes: at least a photodiode outputting a signal with a value according to a quantity of light received by the photodiode; a thin film transistor element; and a charge storage element,
the charge storage element having one electrode thereof electrically connected to a cathode electrode of the photodiode and having the other electrode thereof electrically connected to a driving wiring for supplying a driving signal to the charge storage element,
the thin film transistor element having a gate electrode thereof electrically connected to a cathode electrode of the photodiode and having a drain electrode thereof electrically connected to an optical sensor output wiring, and
the driving wiring for the charge storage element being electrically connected to a power supply wiring electrically connected to a source electrode of the thin film transistor element.

5. An electronics device comprising;
a display device including;
a pixel array in which a plurality of pixels are arranged in matrix, each of the plurality of pixels including a display element and a switching element connected to the display element; and
a two-dimensional sensor array in which a plurality of optical sensor circuits are two-dimensionally arranged,
each of the optical sensor circuits including at least a photodiode outputting a signal with a value according to a quantity of light received by the photodiode, a thin film transistor element, and a charge storage element,
the charge storage element having one electrode thereof electrically connected to a cathode electrode of the photodiode and having the other electrode thereof electrically connected to a driving wiring for supplying a driving signal to the charge storage element,
the thin film transistor element having a gate electrode thereof electrically connected to a cathode electrode of the photodiode and having a drain electrode thereof electrically connected to an optical sensor output wiring, and
the driving wiring for the charge storage element being electrically connected to a power supply wiring electrically connected to a source electrode of the thin film transistor element.

* * * * *